(12) United States Patent
Zhu et al.

(10) Patent No.: US 7,700,513 B2
(45) Date of Patent: Apr. 20, 2010

(54) SUPPORTED CATALYST FOR OLEFIN POLYMERIZATION

(75) Inventors: Zhidong Zhu, Houston, TX (US); Main Chang, Houston, TX (US)

(73) Assignee: BASF Catalysts LLC, Florham Park, NJ (US)

( * ) Notice: Subject to any disclaimer, the term of this patent is extended or adjusted under 35 U.S.C. 154(b) by 304 days.

(21) Appl. No.: 11/753,471

(22) Filed: May 24, 2007

(65) Prior Publication Data

US 2007/0243998 A1 Oct. 18, 2007

Related U.S. Application Data

(62) Division of application No. 11/185,126, filed on Jul. 20, 2005, now Pat. No. 7,326,757.

(51) Int. Cl.
*C08F 4/02* (2006.01)
*B01J 31/38* (2006.01)

(52) U.S. Cl. .................. 502/115; 502/103; 502/120; 502/233; 502/439

(58) Field of Classification Search ............. 502/103, 502/115, 120, 233, 439
See application file for complete search history.

(56) References Cited

U.S. PATENT DOCUMENTS

| | | | |
|---|---|---|---|
| 4,639,430 A | 1/1987 | Pasquet et al. | |
| 5,064,799 A | 11/1991 | Monte et al. | |
| 5,227,439 A * | 7/1993 | Luciani et al. | 526/124.6 |
| 5,244,854 A | 9/1993 | Noristi et al. | |
| 5,633,419 A | 5/1997 | Spencer et al. | |
| 5,661,097 A | 8/1997 | Spencer et al. | |
| 5,798,314 A * | 8/1998 | Spencer et al. | 502/115 |

* cited by examiner

*Primary Examiner*—Ling-Siu Choi
(74) *Attorney, Agent, or Firm*—Cheng Q. Song

(57) ABSTRACT

Disclosed are catalyst systems and methods of making the catalyst systems for the polymerization of an olefin containing a solid titanium catalyst component containing an inorganic titanium compound, a magnesium alcohol adduct made from an inorganic magnesium compound and an alcohol, and a porous support having at least one of a certain specific surface area, a certain pore volume, and a certain median particle size. The catalyst system may further contain an organoaluminum compound and optionally an organosilicon compound. Also disclosed are methods of making polyolefins.

20 Claims, 3 Drawing Sheets

SUPPORTED CATALYST FOR OLEFIN POLYMERIZATION

CROSS-REFERENCE TO RELATED APPLICATIONS

This application claims the benefit of and is a Divisional application of application Ser. No. 11/185,126 filed on Jul. 20, 2005, now U.S. Pat. No. 7,326,757, which is hereby incorporated by reference.

FIELD OF THE INVENTION

The subject invention generally relates to supported olefin polymerization catalyst systems catalyst systems for making olefin polymers and methods of making the catalyst systems and olefin polymers.

BACKGROUND

Polyolefins are a class of polymers derived from simple olefins. Known methods of making polyolefins involve the use of Ziegler-Natta polymerization catalysts. These catalysts polymerize vinyl monomers using a transition metal compound to provide a stereoregulated polymer.

Numerous Ziegler-Natta polymerization catalysts exist. The catalysts have different characteristics and/or lead to the production of polyolefins having diverse properties. Moreover, polyolefins made with the use of Ziegler-Natta polymerization catalysts vary in stereoregularity, molecular weight distribution, impact strength, melt-flowability, rigidity, heat sealability, isotacticity, and the like.

Silica supported Ziegler-Natta polymerization catalysts generally are made through a precipitation method using an organic magnesium compound starting material. The organic magnesium compound is chlorinated to provide magnesium chloride. However, the chlorination procedure tends to badly corrode manufacturing equipment and introduces harmful environmental concerns.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides olefin polymerization catalyst systems, methods of making the olefin polymerization catalyst systems, and methods of polymerizing (and copolymerizing) olefins involving the use of a solid titanium catalyst component containing a porous support having certain physical characteristics. Use of the porous support, and inorganic magnesium and titanium compounds provides an olefin polymerization catalyst system with at least one of high catalyst efficiency, low cost, environmentally friendly manufacturing techniques, the production of polymer particles having desired (controllable) morphology, the production of polymer particles having desired bulk density, and the production of impact copolymer with a high ethylene content.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
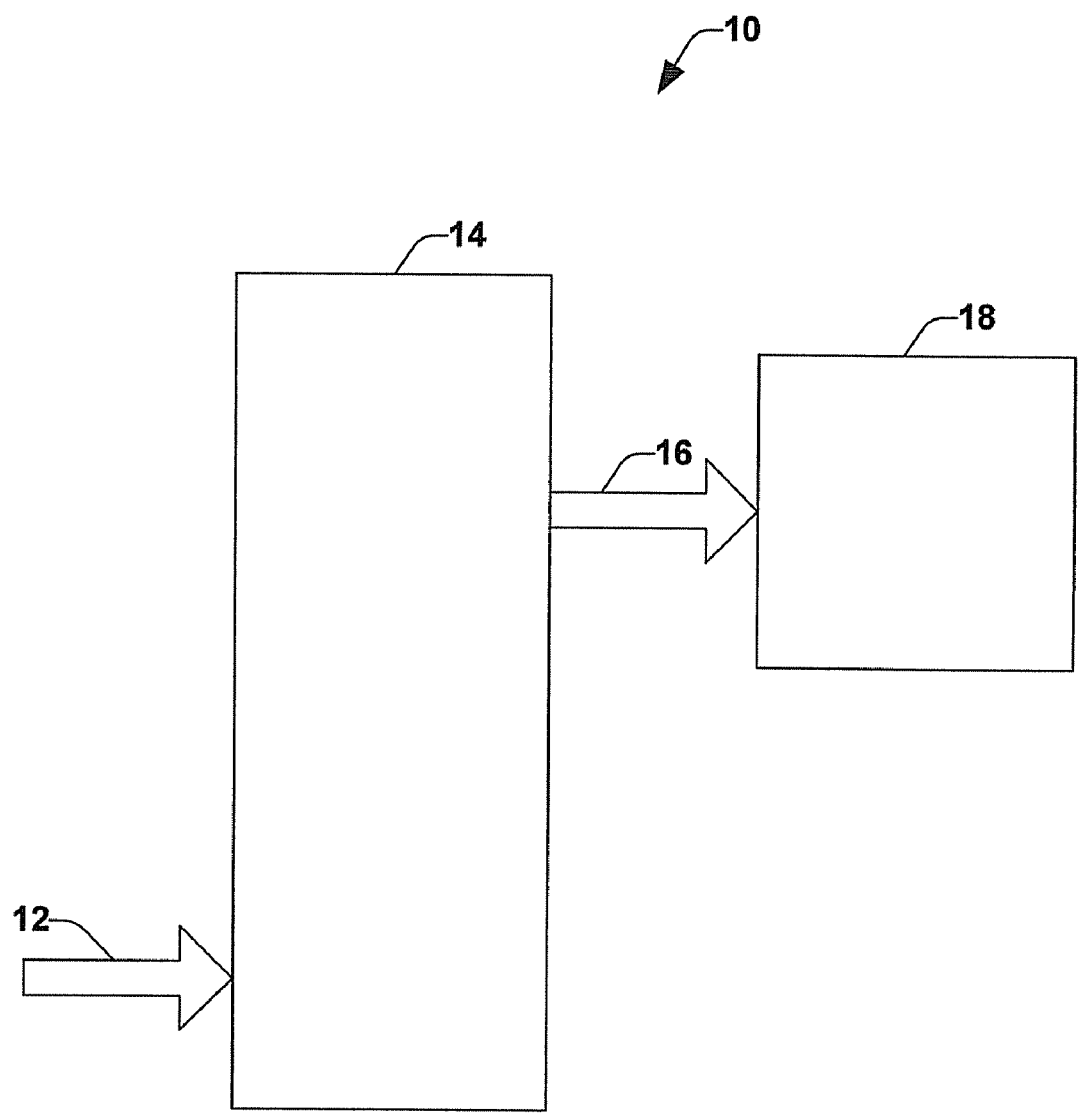
FIG. 1 is a high level schematic diagram of an olefin polymerization system in accordance with one aspect of the subject invention.

The subject invention relates to solid titanium catalyst components, catalyst systems, methods of making solid titanium catalyst components and catalyst systems, and methods of making polyolefins including polyethylenes such as high density polyethylene (HDPE) and linear low density polyethylene (LLDPE), polypropylene, ethylene-propylene copolymers, and impact copolymers, such as polymer rubber intimately mixed in a polyolefin matrix.

An aspect of the invention involves forming the catalyst support from an inorganic magnesium compound, an alcohol, and solid, porous support having certain physical characteristics. Use of the inorganic magnesium compound, an alcohol, a solid, porous support having certain physical characteristics eliminates the need to chlorinate an organometallic magnesium compound, and since a chlorination procedure is eliminated, undesirable environmental concerns are mitigated (harmful waste streams are mitigated). Corrosion of manufacturing equipment caused by chlorination procedures is also eliminated. Moreover, use of an inorganic magnesium compound is much less expensive than using an organometallic magnesium compound, thereby reducing costs of catalyst manufacture.

There are a number of benefits associated with the solid titanium catalyst components. The use of the porous support having certain physical characteristics and inorganic magnesium compound also contributes to the ability to form a solid titanium catalyst component of substantially spherical shape. The substantially spherical shape of the solid titanium catalyst component contributes to the ability of the catalyst system in various polymerization methods to provide an improved level of control over the properties of the resultant polymer products (properties such as bulk density, glass transition temperature, adhesion properties, coefficients of temperature induced expansion/contraction, improved flowability, and the like).

The subject invention further relates to an olefin polymerization catalyst system formed from a solid titanium catalyst component comprising titanium and a catalyst support made from an inorganic magnesium compound, an alcohol, a porous support having certain physical characteristics, and optionally an internal electron donor; an organoaluminum compound; and optionally an organosilicon compound (external electron donor), or a derivative derived from any of these groups; and a polymerization process which comprises polymerizing or copolymerizing olefins in the presence of the polymerization catalyst system described above.

Generally speaking, the solid titanium catalyst component is made by contacting at least one inorganic magnesium compound with an alcohol in an organic medium; then contacting a porous support having certain physical characteristics with the inorganic magnesium compound-alcohol product. After the inorganic magnesium compound-alcohol product is impregnated on the porous support, an inorganic titanium compound and optionally an internal electron donor are contacted with the impregnated porous support. The desirable and beneficial properties of the solid titanium catalyst component are not obtained when the alcohol, inorganic magnesium compound, porous support having certain physical characteristics, and inorganic titanium compound are otherwise not employed.

The porous support has physical characteristics that lead to the fabrication of desirable and beneficial solid titanium catalyst components. That is, the porous support directly contributes to many of the beneficial properties of the solid titanium catalyst component in particular and olefin catalyst system generally. In this connection, the support is a necessary feature of the invention. Specifically the porous support has at least one of a certain specific surface area, a certain pore volume, and a certain median particle size to contribute to the desirable and beneficial properties of the solid titanium catalyst components. The porous support may have at least two of a certain specific surface area, a certain pore volume, and a certain median particle size to contribute to the desirable and beneficial properties of the solid titanium catalyst components. The porous support may have all three of a certain specific surface area, a certain pore volume, and a certain median particle size to contribute to the desirable and beneficial properties of the solid titanium catalyst components.

In one embodiment, the specific surface area of the porous support is about 100 $m^2/g$ or more and about 2,000 $m^2/g$ or less. In another embodiment, the specific surface area of the porous support is about 200 $m^2/g$ or more and about 1,500 $m^2/g$ or less. In yet another embodiment, the specific surface area of the porous support is about 300 $m^2/g$ or more and about 1,000 $m^2/g$ or less. Specific surface area can be determined using conventional techniques involving nitrogen absorption isotherms such as using ASTM D3663-03 entitled "Standard Test Method for Surface Area of Catalysts and Catalyst Carriers" which is incorporated by reference herein.

In one embodiment, the pore volume of the porous support is about 0.2 cc/g or more and about 5 cc/g or less. In another embodiment, the pore volume of the porous support is about 0.3 cc/g or more and about 4 cc/g or less. In yet another embodiment, the pore volume of the porous support is about 0.5 cc/g or more and about 3 cc/g or less. Pore volume may be determined by a nitrogen absorption test, such as using a method in accordance with the analysis method outlined in ASTM D 4641-88 entitled "Standard practice for calculation of pore size distributions of catalysts from nitrogen absorption isotherms" which is incorporated by reference herein.

In one embodiment, the median particle size (by volume) of the porous support is about 1 micron or more and about 200 microns or less. In another embodiment, the median particle size (by volume) of the porous support is about 5 microns or more and about 150 microns or less. In yet another embodiment, the median particle size (by volume) of the porous support is about 10 microns or more and about 100 microns or less. Median particle size can be determined using customary techniques such as using conventional methods and devices for measuring particle sizes. For the purposes of this invention, median particle size is determined by conventional laser diffraction techniques using a Malvern Instrument. Generally speaking, light from a laser is directed at a cloud of particles suspended in a transparent medium. The particles scatter the light, and smaller particles scattering the light at larger angles than bigger particles. The scattered light is measured by a series of photodetectors placed at different angles.

The porous support material can be obtained from a plethora of commercial sources, including Grace Davison, Ineos, Engelhard, and the like.

The porous support contains and/or is made of a material that can support titanium and an inorganic magnesium compound-alcohol product (and optionally an internal electron donor). General examples of porous support materials include metal oxides and other materials having hydroxyl groups on the surface.

Specific examples of porous support materials include silica, alumina, alumina-silicates, ceria, zeolites, clay, zirconia, titania, zinc oxide, and the like.

The inorganic magnesium compounds used in the preparation of the solid titanium catalyst component include, for example, magnesium halides. By the term inorganic, the inorganic magnesium compounds do not contain a carbon atom (such as an organometallic magnesium compound such as alkoxy magnesiums). Examples of inorganic magnesium compounds include magnesium chloride, magnesium bromide, magnesium iodide and magnesium fluoride, hydrates of any of the magnesium halides, and the like.

The alcohol facilitates dissolving the inorganic magnesium compound by combining with the inorganic magnesium compound to provide an adduct. General examples of alcohols include primary alcohols, alkyl alcohols, alkenyl alcohols, and aromatic alcohols. In these general examples, the alkyl, alkenyl, aromatic groups contain from 1 to about 12 carbon atoms. In another embodiment, the alkyl, alkenyl, aromatic groups contain from about 2 to about 8 carbon atoms. Examples of alcohols include methanol, ethanol, n-propanol, isopropanol, n-butanol, iso-butanol, t-butanol, n-pentanol, iso-pentanol, hexanol, 2-ethylhexanol, decanol, cyclohexanol, phenol, and the like.

The organic medium in which the inorganic magnesium compound and alcohol are contacted include one or more organic solvents and/or organic liquids. Preferably the organic solvent is capable of permitting and facilitating the formation of an adduct from the inorganic magnesium compound and the alcohol. Examples of organic solvents include alkanes such as butane, pentane, hexane, heptane, octanes, decane, kerosene, cyclopentane, cyclohexane, and cyclooctane; aromatic hydrocarbons such as benzene, toluene, xylene, ethylbenzene, and naphthalenes; oxygen containing compounds such as alcohols and glycols; ketones; esters; ethers; and the like.

A suitable amount of the organic medium is employed when the inorganic magnesium compound and alcohol are contacted to form the magnesium alcohol adduct. In one embodiment, when contacting the inorganic magnesium compound and alcohol, the molar ratio of the organic medium to inorganic magnesium compound is about 1:1 to about 50:1. In another embodiment, when contacting the inorganic magnesium compound and alcohol, the molar ratio of the organic medium to inorganic magnesium compound is about 2:1 to about 30:1. In yet another embodiment, when contacting the inorganic magnesium compound and alcohol, the molar ratio of the organic medium to inorganic magnesium compound is about 3:1 to about 10:1.

The inorganic magnesium compound, alcohol, and organic medium can be combined in any order (all at once; the inorganic magnesium compound and the organic medium initially combined, followed by separate, semi-simultaneous, or simultaneous additions of the alcohol; or the alcohol and the organic medium initially combined, followed by addition of the inorganic magnesium compound). When the components are not added at the same time, the mixture as it is formed may be heated to discrete temperatures after adding some or all of the components (that is, between adding components).

The mixture of the magnesium compound, alcohol, and organic medium (or any submixture containing less than all of these components) may be heated above room temperature for a suitable amount of time. In one embodiment, the mixture or a submixture is heated to a temperature from about 40° C. to about 200° C. In another embodiment, the mixture or a submixture is heated to a temperature from about 60° C. to about 140° C. In yet another embodiment, the mixture or a submixture is heated to a temperature from about 80° C. to about 120° C. In one embodiment, the mixture or a submixture is heated for a period of time from about 10 minutes to about 15 hours. In another embodiment, the mixture or a submixture is heated for a period of time from about 30 minutes to about 10 hours. In yet another embodiment, the mixture or a submixture is heated for a period of time from about 1 hour to about 4 hours.

Suitable relative amounts of the inorganic magnesium compound and alcohol are contacted to form the magnesium alcohol adduct. In one embodiment, when contacting the inorganic magnesium compound and alcohol, the molar ratio of alcohol to inorganic magnesium compound is about 0.1:1 to about 1:0.1. In another embodiment, when contacting the inorganic magnesium compound and alcohol, the molar ratio of alcohol to inorganic magnesium compound is about 0.25:1 to about 1:0.25. In yet another embodiment, when contacting the inorganic magnesium compound and alcohol, the molar ratio of alcohol to inorganic magnesium compound is about 0.5:1 to about 1:0.5.

The magnesium alcohol adduct may be recovered from the mixture by any suitable means, such as precipitation techniques. In one embodiment, however, the magnesium alcohol adduct is not formed or recovered using spray drying. In another embodiment, the magnesium alcohol adduct is not dealcoholed. The magnesium alcohol adduct is then contacted with the porous support in the same or different organic medium to impregnate the porous support with the magnesium alcohol adduct. Alternatively, if the magnesium alcohol adduct is not recovered from the mixture, the magnesium alcohol adduct is contacted with the porous support in the organic medium in which the magnesium alcohol adduct is formed to impregnate the porous support with the magnesium alcohol adduct.

The impregnated support may be recovered from the organic medium by any suitable means, such as precipitation techniques, filtering techniques, and the like. The solid titanium catalyst component may be prepared by contacting the impregnated support with an inorganic titanium compound. Alternatively, if the impregnated support is not recovered from the organic medium, an inorganic titanium compound is contacted with the impregnated support in the organic medium to form the solid titanium catalyst component.

The inorganic titanium compound used in the preparation of the solid titanium catalyst component is, for example, an inorganic tetravalent titanium compound represented by Formula (I)

$$\text{Ti}(R)_g X_{4-g} \quad (I)$$

wherein each R independently represents a non-halogen inorganic group, X represents a halogen atom, and $0 \leq g \leq 4$. By the term inorganic, the inorganic titanium compounds do not contain a carbon atom (such as an organometallic titanium compounds such as alkoxy titaniums and alkoxy titanium halides). Specific examples of the inorganic titanium compound include titanium tetrahalides such as $TiCl_4$, $TiBr_4$ and $TiI_4$. These titanium compounds may be used individually or in a combination of two or more. They may be used as dilutions in hydrocarbon compounds or halogenated hydrocarbons.

When preparing the solid titanium catalyst component, an internal electron donor is optionally used/added. Generally speaking, when the desired olefin is or contains polypropylene, an internal electron donor is typically used. Internal electron donors, for example, oxygen-containing electron donors such as alcohols, certain organosilicon compounds, phenols, ketones, aldehydes, carboxylic acids, organic or inorganic acid esters, ethers, acid amides and acid anhydrides, and nitrogen-containing electron donors such as ammonia, amines, nitriles and isocyanates.

Specific examples include organic acid esters having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dipropyl phthalate, diisopropyl phthalate, dibutyl phthalate, diisobutyl phthalate, dioctyl phthalate, gamma-butyrolactone, delta-valerolactone, coumarine, phthalide and ethylene carbonate; inorganic acid esters such as ethyl silicate, butyl silicate, vinyltriethoxysilane, phenyltriethoxysilane and diphenyldiethoxysilane; acid halides having 2 to about 15 carbon atoms such as acetyl chloride, benzoyl chloride, tolyl chloride, anisoyl chloride and phthaloyl dichloride; ethers having 2 to about 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

Esters may also be employed as internal electron donors for use with the titanium catalyst component. Examples of these esters are compounds represented by the following formulae

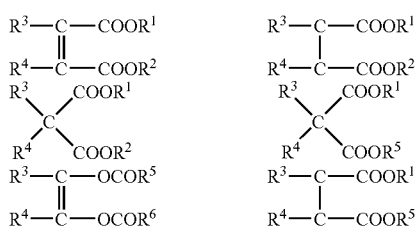

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, at least one of them is preferably a substituted or unsubstituted hydrocarbon group, and $R^3$ and $R^4$ may be linked to each other. In one embodiment, the substituted or unsubstituted hydrocarbon groups contain from 1 to about 30 carbon atoms.

Examples of the substituted hydrocarbon groups for $R^1$ through $R^5$ are hydrocarbon groups having groups containing hetero atoms such as N, O and S, for example, C—O—C, COOR, COOH, OH, $SO_3H$, —C—N—C— and $NH_2$. Especially preferred are diesters of dicarboxylic acids in which at least one of $R^1$ and $R^2$ is an alkyl group having at least about 2 carbon atoms.

Specific examples of polycarboxylic acid esters include aliphatic polycarboxylic acid esters such as diethyl succinate, dibutyl succinate, diethyl methylsuccinate, dipropylsuccinate, dipentylsuccinate, dihexylsuccinate, dioctylsuccinate, didecylsuccinate, butlyoctylsuccinate, didodecylsuccinate, and other alkylsuccinates, diisobutyl alpha-methylglutarate, diethyl malonate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, diethyl maleate, monooctyl maleate, dioctyl maleate, di-n-butyl maleate, di-iso-butyl maleate, dibutyl butylmaleate, diethyl butylmaleate, diethyl adipate, dibutyl adipate, diethyl sebacate, dibutyl sebacate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethlisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, di-iso-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate, dibutyl trimellitate, triethyl hemimellitate, tributyl hemimellitate, tetraethyl pyromellitate, tetrabutyl pyromellitate, diethyl 1,2-cyclohexane-dicarboxylate, and dibutyl-1,2-cyclohexane-dicarboxylate; and heterocyclic polycarboxylic acid esters such as 3,4-furanedicarboxylic acid esters. Specific examples of the polyhydroxy compound esters may include 1,2-diacetoxybenzene, 1-methyl-2,3-diacetoxybenzene, 2-methyl-2,3-diacetoxybenzene, 2,8-diacetoxynaphthalene, ethylene glycol dipivalate and butanediol pivalate. Specific examples of the hydroxy-substituted carboxylic acid esters are benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred.

Another group of internal electron donors that can be included in the titanium catalyst component are monocarboxylic acid esters represented by RCOOR' where R and R' are hydrocarboyl groups that may have a substituent, and at least one of them is a branched (including alicyclic) or ring-containing aliphatic group. Specifically, at least one of R and R' may be $(CH_3)_2CH$—, $C_2H_5CH(CH_3)$—, $(CH_3)_2CHCH_2$—, $(CH_3)_3C$—, $C_2H_5CH$—, $(CH_3)CH_2$—, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as methanol, ethanol, isopropanol, isobutanol and tert-butanol.

The internal electron donors may be used individually or in combination. In employing the internal electron donor, they do not have to be used directly as starting materials, but compounds convertible to the electron donors in the course of preparing the titanium catalyst components may also be used as the starting materials.

The solid titanium catalyst component may be formed by contacting the magnesium containing catalyst support, the titanium compound, and the internal electron donor by known methods used to prepare a highly active titanium catalyst component from a magnesium support, a titanium compound, and an electron donor.

Several examples of the method of producing the solid titanium catalyst component are briefly described below.

(1) The magnesium alcohol adduct impregnated support optionally with the internal electron donor, is contacted with the inorganic titanium compound in the liquid phase.

(2) The magnesium alcohol adduct impregnated support and the inorganic titanium compound are contacted in the presence of the optional internal electron donor to precipitate a solid titanium complex.

(3) The reaction product obtained in (2) is further reacted with an inorganic titanium compound.

(4) The reaction product obtained in (1) or (2) is further contacted with the optional internal electron donor and the inorganic titanium compound.

(5) The product obtained in (1) to (4) is treated with a halogen, a halogen compound or an aromatic hydrocarbon.

(6) The magnesium alcohol adduct impregnated support is contacted with the optional internal electron donor, the inorganic titanium compound and/or a halogen-containing hydrocarbon.

(7) The magnesium alcohol adduct impregnated support is contacted with the inorganic titanium compound in the liquid phase, filtered and washed. The product is further contacted with the optional internal electron donor and the inorganic titanium compound, then activated with additional inorganic titanium compound in an organic medium.

In embodiments of making the solid titanium catalyst component according to examples (2), (3), (4) and (5), the magnesium alcohol adduct impregnated support solution is mixed with liquid titanium tetrahalide to form a solid precipitate in the optional presence of an auxiliary precipitant. A polycarboxylic acid ester may be added before, during or after the precipitation of the solids and loaded on the solid.

The process of solids precipitation can be carried out by adding liquid titanium tetrahalide dropwise into a magnesium alcohol adduct impregnated support solution at low or room temperature to precipitate out solids immediately. An internal electron donor is optionally present in the reaction system. The internal electron donor can be added either after the magnesium alcohol adduct impregnated support solution is obtained or together with the magnesium alcohol adduct impregnated support.

To facilitate obtaining uniform solid particles, the process of precipitation can be carried out slowly. When adding inorganic titanium compound dropwise at low or room temperature is applied, the process may take place over a period from about 1 hour to about 6 hours.

The solid precipitate is first separated from the mixture. In the solid precipitate thus obtained may be entrained a variety of complexes and impurities, so that further treatment may in some instances be necessary.

The solid precipitate is washed with an inert diluent and then treated with titanium tetrahalide or a mixture of titanium tetrahalide and an inert diluent. The titanium tetrahalide used in this act is identical to or different with the inorganic titanium compound used. The amount of titanium tetrahalide used is from about 1 to about 20 moles, such as from about 2 to about 15 moles, per mole of magnesium in the porous support. The treatment temperature ranges from about 50° C. to about 150° C., such as from about 60° C. to about 100° C. If a mixture of titanium tetrahalide and inert diluent is used to treat the solid precipitate, the volume % of titanium tetrahalide in the treating solution is from about 10% to about 100%, the rest being an inert diluent.

The treated solids can be further washed with an inert diluent to remove ineffective titanium compounds and other impurities. The inert diluent herein used can be hexane, heptane, octane, 1,2-dichloroethane, benzene, toluene, xylenes, and other hydrocarbons.

In one embodiment, particularly embodiments following example (2) described above, the solid catalyst component has the following chemical composition: titanium, from about 1 to about 7 wt %; magnesium, from about 3 to about 15 wt %; halogen, from about 10 to about 40 wt %; optional internal electron donor, from about 0.5 to about 15 wt %; and porous support from about 40 to about 85 wt %.

The solid titanium catalyst component is a highly active catalyst component comprising titanium, a magnesium alcohol adduct, a porous support, and optionally an internal electron donor. The amounts of the ingredients used in preparing the solid titanium catalyst component may vary depending upon the method of preparation. In one embodiment, from about 0.01 to about 5 moles of the optional internal electron donor and from about 0.01 to about 500 moles of the inorganic titanium compound are used per mole of the inorganic magnesium compound used to make the solid titanium catalyst component. In another embodiment, from about 0.05 to about 2 moles of the optional internal electron donor and from about 0.05 to about 300 moles of the inorganic titanium compound are used per mole of the inorganic magnesium compound used to make the solid titanium catalyst component.

In one embodiment, in the solid titanium catalyst component, the atomic ratio of halogen/titanium is from about 4 to about 200; the optional internal electron donor/titanium mole ratio is from about 0.01 to about 10; and the magnesium/titanium atomic ratio is from about 1 to about 100. In another embodiment, in the solid titanium catalyst component, the atomic ratio of halogen/titanium is from about 5 to about 100; the optional internal electron donor/titanium mole ratio is from about 0.2 to about 6; and the magnesium/titanium atomic ratio is from about 2 to about 50.

In one embodiment, the size (diameter) of the solid titanium catalyst component formed in accordance with the present invention is from about 10 microns to about 150 microns (on a 50% by volume basis). In another embodiment, the size (diameter) of the solid titanium catalyst component is from about 20 microns to about 100 microns (on a 50% by volume basis). In yet another embodiment, the size (diameter) of the solid titanium catalyst component is from about 30 microns to about 80 microns (on a 50% by volume basis).

The solid titanium catalyst component may be used as a catalyst component for making polyolefins after being combined or diluted with an inorganic or organic compound such as a silicon compound, an aluminum compound.

Methods of preparing the solid titanium catalyst component, which can be used in the subject invention so long as the porous support, an alcohol, an inorganic magnesium compound, and an inorganic titanium compound are used, are described in U.S. patents and U.S. patent Publications: U.S. Pat. Nos. 4,639,430; 5,064,799; 5,227,439; 5,244,854; 5,278,117; 5,633,419; 5,661,097; and 5,798,314; which are hereby incorporated by reference in this regard.

The catalyst system may contain at least one organoaluminum compound in addition to the solid titanium catalyst component. Compounds having at least one aluminum-carbon bond in the molecule can be used as the organoaluminum compound. Examples of organoaluminum compounds include compounds of the following Formula (II).

$$R_m^7 Al(OR^8)_n H_p X_q^1 \qquad (II)$$

In Formula (II), $R^7$ and $R^8$ may be identical or different, and each represent a hydrocarbon group usually having 1 to about 15 carbon atoms, preferably 1 to about 4 carbon atoms; $X^1$ represents a halogen atom, $0 \leq q < 3$, $0 \leq p < 3$, $0 \leq n < 3$, and $m+n+p+q=3$.

Specific examples of the organoaluminum compounds represented by Formula (II) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^7 Al(OR^8)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

The organoaluminum compound catalyst component is used in the catalyst system in an amount that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may optionally contain at least one organosilicon compound in addition to the solid titanium catalyst component. This organosilicon compound is sometimes termed an external electron donor. In instances where polypropylene is made as the olefin (or portion of the copolymer), the organosilicon compound/external electron donor is employed. The organosilicon compound contains silicon having at least one hydrocarbon ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, contributes to the ability to obtain a polymer (at least a portion of which is polyolefin) having a broad molecular weight distribution and controllable crystallinity while retaining high performance with respect to catalytic activity and the yield of highly stereoregular polymer.

The organosilicon compound is used in the catalyst system in an amount that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ratio of the organoaluminum compound to the organosilicon compound is from about 7 to about 35.

In one embodiment, the organosilicon compound is represented by Formula (III)

$$R_n^9 Si(OR^{10})_{4-n} \tag{III}$$

wherein $R^9$ and $R^{10}$ represent a hydrocarbon group, and n is $0 \leq n < 4$. Specific examples of the organosilicon compound of Formula (III) include trimethylmethoxysilane, trimethylethoxysilane, dimethyldimethoxysilane, dimethydiethoxysilane, diisopropylldimethoxysilane, t-butyl methyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyidimethoxysilane, bis-p-tolyldimethoxysilane, bis-p-totyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

In another aspect of the subject invention, the organosilicon compound is represented by Formula (IV)

$$SiR^{11}R_m^{12}(OR^{13})_{3-m} \tag{IV}$$

In the above Formula (IV), $0 \leq m < 3$, such as $0 \leq m \leq 2$; and $R^{11}$ represents a cyclopropyl group, cyclobutyl group, cyclopentyl group, a cyclopentenyl group, a cyclopentadienyl group, cyclohexyl group, or a derivative of any of these. The derivative may preferably be, for example, a cyclopentyl group substituted by 1 to about 4 alkyl groups having 1 to about 4 carbon atoms, an alkyl group having 2 to about 4 carbon atoms substituted by a cyclopentyl group which may be substituted by 1 to about 4 alkyl groups having 1 to about 4 carbon atoms, a cyclopentenyl group substituted by 1 to about 4 alkyl groups having 1 to about 4 carbon atoms, a cyclopentadienyl group substituted by 1 to about 4 alkyl groups having 1 to about 4 carbon atoms, or an indenyl, indanyl, tetrahydroindenyl or fluorenyl group which may be substituted by 1 to about 4 alkyl groups having 1 to about 4 carbon atoms.

Specific examples of the group $R^{11}$ include cyclopropyl, cyclobutyl, cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tertiary butyl cyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl, 1-methyl-1-cyclopentylethyl, cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-dimethyl-3-cyclopentenyl, 2,3,4,5-tetramethyl-3-cyclopentenyl, 2,2,5,5-tetramethyl-3-cyclopentenyl, 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2-dimethyl-2,4-cyclopentadienyl, 2,3-dimethyl-2,4-cyclopentadienyl, 2,5-dimethyl-2,4-cyclopentadienyl, 2,3,4,5-tetramethyl-2,4-cyclopentadienyl, indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6,7-tetrahydroindenyl, 4,5,6,7-tetrahydro-2-indenyl, 4,5,6,7-tetrahydro-1-methyl-2-indenyl, 4,5,6,7-tetrahydro-1,3-dimethyl-2-indenyl, fluorenyl groups, cyclohexyl, methylcyclohexyls, ethylcyclohexyls, propylcyclohexyls, isopropylcyclohexyls, n-butylcyclohexyls, tertiary-butyl cyclohexyls, dimethylcyclohexyls, and trimethylcyclohexyls.

In Formula (IV), $R^{12}$ and $R^{13}$ are identical or different and each represents a hydrocarbon. Examples of $R^{12}$ and $R^{13}$ are alkyl, cycloalkyl, aryl and aralkyl groups having 3 or more carbon atoms. Furthermore, $R^{11}$ and $R^{12}$ may be bridged by an alkyl group, etc. General examples of organosilicon compounds are those of Formula (IV) in which $R^{11}$ is a cyclopentyl group, $R^{12}$ is an alkyl group such as methyl or a cyclopentyl group, and $R^{13}$ is an alkyl group, particularly a methyl or ethyl group.

Specific examples of organosilicon compounds of Formula (IV) include trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl) dimethoxysilane, bis(3-tertiary butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyidimethoxysilane, di(3-cyclopentenyl)dimethoxysilane, bis(2,5-dimethyl-3-cyclopentenyl)dimethoxysilane, di-2,4-cyclopentadienyidimethoxysilane, bis(2,5-dimethyl-2,4-cyclopentadienyl)dimethoxysilane, bis(1-methyl-1-cyclopentylethyl)dimethoxysilane, cyclopentylcyclopentenyidimethoxysilane, cyclopentylcyclopentadienyidimethoxysilane, diindenyidimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyld iethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and diindenylcyclopentylmethoxysilane; and ethylenebis-cyclopentyldimethoxysilane.

In another aspect of the subject invention, the organosilicon compound is a polyorganosilicon compound containing, as a monomer, any of the organosilicon compounds described above.

Polymerization of olefins is carried out in the presence of the catalyst systems described above. Generally speaking, olefins are contacted with the catalyst system described above under suitable conditions to form desired polymer products. In one embodiment, the polymerization is carried out by adding an olefin and the catalyst system to an inert hydrocarbon medium and reacting the olefin under suitable conditions in a reaction or polymerization zone. In another embodiment, the formation of impact copolymer is carried out using at least two polymerization zones.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the polymerization, a liquid olefin may be used in place of part or the whole of the inert hydrocarbon medium.

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the polymerization processes, these alpha-olefins may be used individually or in any combination with another olefin or other monomer. The resultant products are the polymers including one or more the olefin monomers.

In one embodiment, an olefin is homopolymerized, or two or more olefins are copolymerized. In another one embodiment, copolymers made with the catalyst system contain from about 50% to about 99% by weight polyolefins and from about 1% to about 50% by weight comonomers (such as thermoplastic or elastomeric monomers). In another embodiment, copolymers made with the catalyst system contain from about 75% to about 98% by weight polyolefins and from about 2% to about 25% by weight non-olefin comonomers. Examples of comonomers include styrene, butadiene, acrylonitrile, acrylamide, alpha-methyl styrene, chlorostyrene, vinyl toluene, divinyl benzene, diallylphthalate, alkyl methacrylates and alkyl acrylates.

In one embodiment, polymerization employs a catalyst system containing the titanium catalyst component in an amount from about 0.001 to about 0.75 millimole calculated as Ti atom per liter of the volume of the polymerization zone, the organoaluminum compound in an amount from about 1 to about 2,000 moles per mole of titanium atoms in the titanium catalyst component, and the optional organosilicon compound (external donor) in an amount from about 0.001 to about 10 moles calculated as Si atoms in the organosilicon compound per mol of the metal atoms in the organoaluminum compound (when present). In another embodiment, polymerization employs a catalyst system containing the titanium catalyst component in an amount from about 0.005 to about 0.5 millimole calculated as Ti atom per liter of the volume of the polymerization zone, the organoaluminum compound in an amount from about 5 to about 500 moles per mole of titanium atoms in the titanium catalyst component, and the optional organosilicon compound in an amount from about 0.01 to about 2 moles calculated as Si atoms in the organosilicon compound per mol of the metal atoms in the organoaluminum compound. In yet another embodiment, polymerization employs a catalyst system optionally containing the organosilicon compound in an amount from about 0.05 to about 1 mole calculated as Si atoms in the organosilicon compound per mol of the metal atoms in the organoaluminum compound.

The use of hydrogen at the time of polymerization promotes and contributes to control of the molecular weight of the resulting polymer, and the polymer obtained may have a high melt flow rate.

In one embodiment, the polymerization temperature is from about 0° C. to about 200° C. In another embodiment, the polymerization temperature is from about 20° C. to about 100° C. In one embodiment, the polymerization pressure is typically from about subatmospheric pressure (about 0.1 bar or more) to about 100 bar. In another embodiment, the polymerization pressure is typically from about 2 bar to about 75 bar. The main polymerization may be carried out batchwise, semi-continuously or continuously. The polymerization may also be carried out in two or more stages under different reaction conditions. The polymerization of an olefin is carried out usually in the gaseous, suspension phase (in a slurry), or liquid phase.

The olefin polymer so obtained may be a homopolymer, a random copolymer, a block copolymer or an impact copolymer. The impact copolymer contains an intimate mixture of a polyolefin homopolymer and a polyolefin rubber. For example, propylene and an ethylene rubber may be formed in two reactors coupled in series to form an impact copolymer. Examples of polyolefin rubbers include ethylene propylene rubbers (EPR) such as ethylene propylene methylene copolymer rubber (EPM) and ethylene propylene diene methylene terpolymer rubber (EPDM). Examples of polyethylenes include high density polyethylene and linear low density polyethylene.

Block copolymerization of propylene or ethylene and another olefin may be carried out in two stages. The polymerization in a first stage may be the homopolymerization of propylene or the copolymerization of propylene with the other olefin. In one embodiment, the amount of the monomers polymerized in the first stage is from about 50 to about 95% by weight. In another embodiment, the amount of the monomers polymerized in the first stage is from about 60 to about 90% by weight. This first stage polymerization may, as required be carried out in two or more stages under the same or different polymerization conditions.

In one embodiment, the polymerization in a second stage is desirably carried out such that the mole ratio of propylene or ethylene to the other olefin(s) is from about 10/90 to about 90/10. In another embodiment, the polymerization in a second stage is desirably carried out such that the mole ratio of propylene or ethylene to the other olefin(s) is from about 20/80 to about 80/20. In yet another embodiment, the polymerization in a second stage is desirably carried out such that the mole ratio of propylene or ethylene to the other olefin(s) is from about 30/70 to about 70/30. Producing a crystalline polymer or copolymer of another olefin may be provided in the second polymerization stage.

The catalysts/methods of the subject invention can in some instances lead to the production of polyolefins including ICPs having xylene solubles (XS) from about 0.5% to about 10%. In another embodiment, polyolefins having xylene solubles (XS) from about 2% to about 7% are produced in accordance with the present invention. In yet another embodiment, polyolefins having xylene solubles (XS) from about 3% to about 6% are produced in accordance with the present invention. XS refers to the percent of solid polymer that dissolves into xylene. A low XS % value generally corresponds to a highly isotactic polymer (i.e., higher crystallinity), whereas a high XS % value generally corresponds to a low isotactic polymer.

The catalysts/methods of the subject invention can in some instances lead to the production of polyolefins including ICPs having bulk densities (BD) of at least about 0.3 cc/g. For example, in one embodiment, a polyolefin product has a BD of at least about 0.35 cc/g. In another embodiment, a polyolefin product has a BD of at least about 0.38 cc/g.

The subject invention can lead to the production of polyolefins including polyethylene, polypropylene, propylene block copolymers, and impact copolymers including polypropylene based impact copolymers having one or more of excellent melt-flowability, moldability, desirable balance between rigidity and elasticity, good stereospecific control, good control over size, shape, size distribution, and molecular weight distribution, impact strength and impact strength with a high catalytic efficiency and/or good operability. Employing the catalyst systems containing solid titanium catalyst component made from an inorganic titanium compound, an inorganic magnesium compound, an alcohol, and solid, porous support having certain physical characteristics yields catalysts simultaneously having high catalytic efficiency and one or more of excellent melt-flowability, extrudability, moldability, rigidity-elasticity, impact strength and impact strength.

The olefin polymer obtained by using the catalyst system may have a very small amount of an amorphous polymer component and therefore a small amount of a hydrocarbon-soluble component. Accordingly, a film molded from this resultant polymer may have low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

Examples of systems for polymerizing olefins are now described. Referring to FIG. 1, a high level schematic diagram of a system 10 for polymerizing olefins is shown. Inlet 12 is used to introduce into a reactor 14 catalyst system components, olefins, optional comonomers, hydrogen gas, fluid media, pH adjusters, surfactants, and any other additives. Although only one inlet is shown, many often are employed. Reactor 14 is any suitable vehicle that can polymerize olefins. Examples of reactors 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 may include downstream processing, such as heating, extrusion, molding, and the like.

Figure 2:
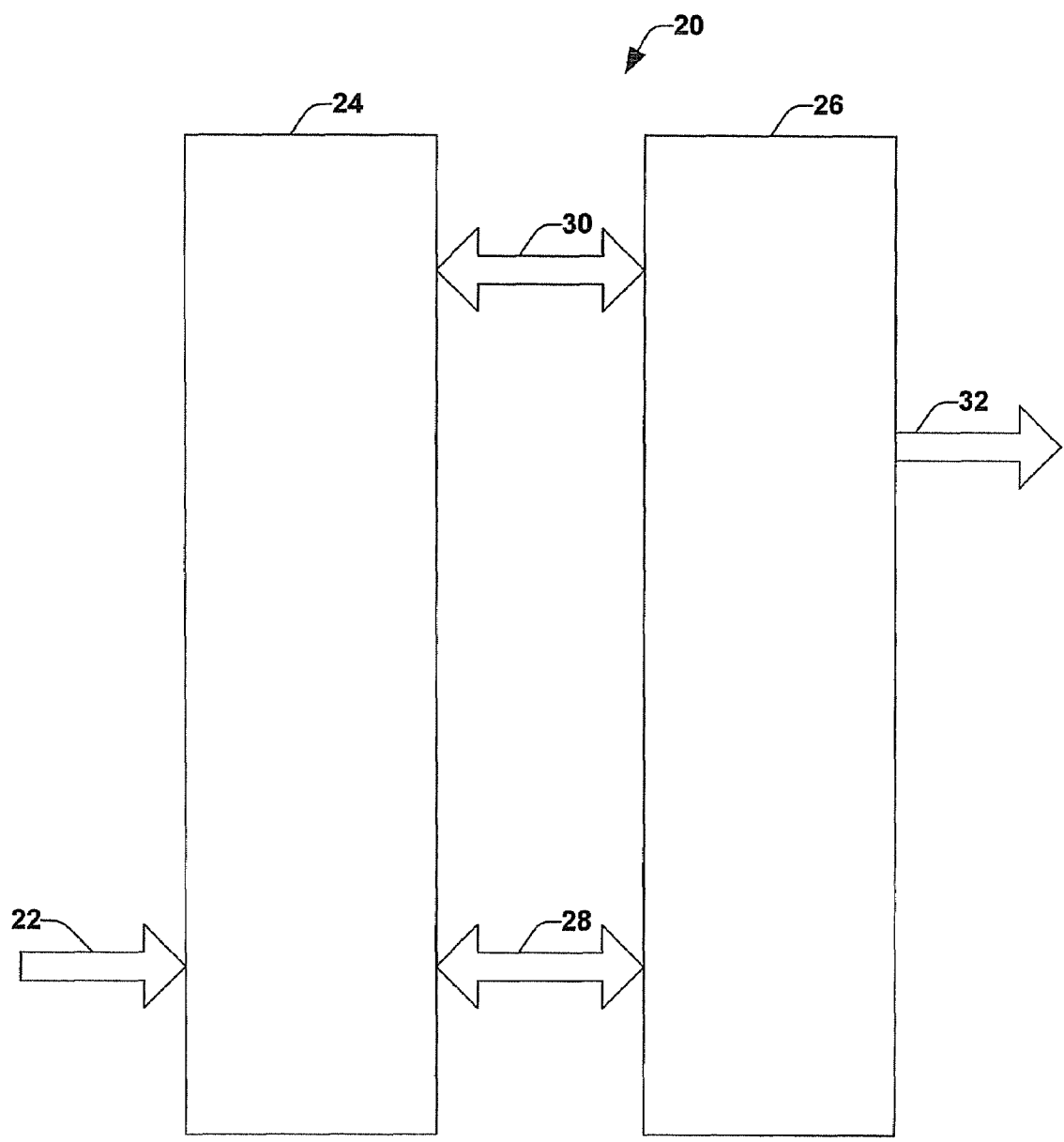
FIG. 2 is a schematic diagram of an olefin polymerization reactor in accordance with one aspect of the subject invention.
Figure 3:
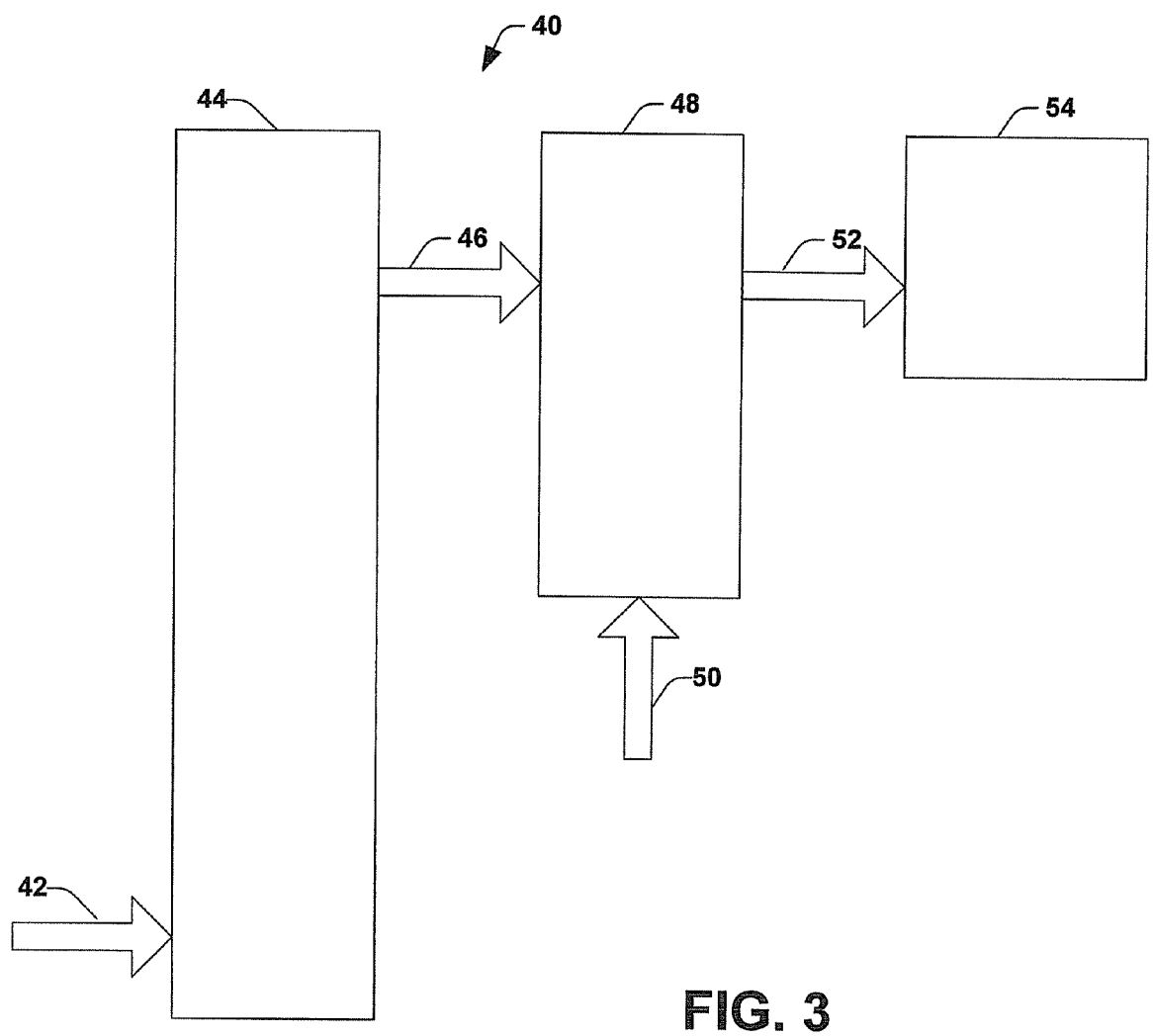
FIG. 3 is a high level schematic diagram of a system for making impact copolymer in accordance with one aspect of the subject invention.

Referring to FIG. 2, a schematic diagram of a multizone circulating reactor 20 that can be employed as the reactor 14 in FIG. 1 or reactor 44 in FIG. 3 for making polyolefins. The multizone circulating reactor 20 substitutes a series of separate reactors with a single reactor loop that permits different gas phase polymerization conditions in the two sides due to use of a liquid barrier. In the multizone circulating reactor 20, a first zone starts out rich in olefin monomer, and optionally one or more comonomers. A second zone is rich in hydrogen gas, and a high velocity gas flow divides the growing resin particles out loosely. The two zones produce resins of different molecular weight and/or monomer composition. Polymer granules grow as they circulate around the loop, building up alternating layers of each polymer fraction in an onion like fashion. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The reactor uses the catalyst systems described above.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact copolymer. A reactor 44, such as a single reactor, a series of reactors, or the multizone circulating reactor is paired with a gas phase or fluidized bed reactor 48 downstream containing the catalyst systems described above to make impact copolymers with desirable impact to stiffness balance or greater softness than are made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. The second reactor 48 may or may not contain catalyst system components. Again, although only one inlet is shown, many often are employed. Once the second polymerization is complete, or as impact copolymers are produced, the polymer product is removed from the second reactor 48 via outlet 52 which leads to a collector 54. Collector 54 may include downstream processing, such as heating, extrusion, molding, and the like. At least one of the first reactor 44 and second reactor 48 contains catalyst systems in accordance with the invention.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process and/or the systems involved in the polymerization process.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

10 g of magnesium chloride is dissolved in the 28 ml of ethanol and 200 ml hexane. 20 g of silica (Grace Davison SYLOPOL 2229) is slurried in magnesium chloride solution for 1 hour. The slurry is cooled down to −20° C. and 50 g of titanium tetrachloride is added. The temperature is increased to 80° C. and 5 ml diisobutyl phthalate (DIBP) is added and cooked for 1 hour. 45.7 g $TiCl_4$ and 206.8 g toluene is added to activate the solid to get the final catalyst.

1.5 ml of 25% triethyl aluminum is injected into the 3.4 liter reactor at 30° C. which is exclusive of air and moisture by nitrogen purge. 0.6 ml 0.128 M cyclohexyl methyl dimethoxy silane and 10 mg catalyst in mineral oil is charged to reactor. Then 3.5 pound of hydrogen gas is charged into the reactor. Then 1500 ml of liquid propylene is added into reactor. The polymerization of propylene proceeds for 1 hour at 70° C. At the end of polymerization, the reactor is cooled down to 20° C. The polypropylene is completely dried in a vacuum oven. The results of this and other examples are given in Table 1.

EXAMPLE 2

Example 1 is repeated but 172 g $TiCl_4$ is added instead of 50 g $TiCl_4$ at −20° C.

EXAMPLE 3

Example 1 is repeated but 130 g $TiCl_4$ is added instead of 50 g $TiCl_4$ at −20° C.

EXAMPLE 4

Example 2 is repeated but 60 ml of ethanol is added instead of 28 ml of ethanol, and the slurry of $MgCl_2$ solution in silica is washed with toluene before $TiCl_4$ addition.

EXAMPLE 5

Example 4 is repeated but 12.5 g $MgCl_2$ is added instead of 10 g $MgCl_2$.

EXAMPLE 6

Example 3 is repeated but 10 ml DIBP is added instead of 5 ml DIBP.

EXAMPLE 7

Example 1 is repeated but Silica XPO-2410 available from Grace Davison is added instead of SYLOPOL 2229.

EXAMPLE 8

Example 1 is repeated but Silica ES757 available from Ineos is added instead of SYLOPOL 2229.

EXAMPLE 9

Example 1 is repeated but Silica MD868 CM available from Ineos is added instead of SYLOPOL 2229.

TABLE 1

| Example | CE kg/g | BD cc/g | D50 µm | XS wt % | MFI g/10 min | D50 µm | <150 vol % |
|---|---|---|---|---|---|---|---|
| 1 | 3.8 | — | 49.99 | — | — | — | — |
| 2 | 16.4 | 0.36 | 47.52 | 5.74 | 3.4 | 1284 | 0 |
| 3 | 17.7 | 0.37 | 46.6 | 4.78 | 5.6 | 1332 | 0 |
| 4 | 21 | 0.4 | 55.02 | 4.11 | 5.8 | 1466 | 0 |
| 5 | 17.8 | 0.38 | 42.96 | 5.83 | 6.4 | 1335 | 0.3 |
| 6 | 20.7 | 0.388 | 48.51 | 3.8 | 3.6 | 1354 | 0.1 |
| 7 | 20.3 | 0.414 | 27.72 | 3.75 | 5.4 | 880 | 0 |
| 8 | 20.3 | 0.455 | 28.75 | 3.41 | 4.1 | 501 | 0 |
| 9 | 17.5 | 0.378 | 14.02 | 3.39 | 5 | 381 | 0.7 |

The characteristics of the catalysts and polymer products of Examples 1-9 are summarized in Table 1. CE refers to catalytic efficiency, BD refers to bulk density, the first D50 refers to an average diameter of the solid titanium catalyst component on a 50% by volume basis as determined by a Malvern Instrument, XS refers to xylene solubles, MFI refers to melt flow index on a g/10 minute basis according to ASTM standard D 1238, the second D50 refers to an average diameter of polymer product on a 50% by volume basis as determined by a Malvern Instrument, and <150 refers to the % by volume of polymer product having an average diameter of less than 150 µm.

EXAMPLE 10

Example 4 is repeated without DIBP. The intermediate is activated using 60 ml $TiCl_4$ and 60 ml hexane at 95° C. for 1 hour. The final catalyst has Ti 5.39% by weight and Mg 5.04% by weight.

Polymerization reactor is purified by 10 times pressurizing and depressurizing with highly pure nitrogen. Vial with catalyst is placed in breaking device before the reactor tightening. TEA, ethylene, hydrogen (0.63 or 0.84 MPa), comonomer (4.4 g at 0.8 MPa) are fed into the reactor in the mentioned order. The polymerization runs are started at 80° C. Total pressure 2.1 MPa is maintained constant during 1-hour run by continuous ethylene feeding. After 1 hour, the monomer is vented off and the polymer obtained is weighed. The catalyst activity is expressed in g PE/g cat/hour. The results are given in Table 2.

TABLE 2

|  | Cat amt. mg | H$_2$ MPa | Activity g PE/g cat/hour |
|---|---|---|---|
| run 1 | 6.7 | 0.63 | 10,298 |
| run 2 | 8.7 | 0.84 | 7,586 |
| run 3 | 5.7 | 0.63 | 10,842 |

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A solid titanium catalyst component for the polymerization of olefins, comprising:
   an inorganic titanium compound;
   a magnesium alcohol adduct made by contacting an inorganic magnesium compound, an alcohol, and an organic medium, wherein the alcohol and the inorganic magnesium compound are contacted at a molar ratio of the alcohol to the inorganic magnesium compound from about 0.1:1 to about 1:0.1, and wherein the organic medium and the inorganic magnesium compound are contacted at a molar ratio of the organic medium to the inorganic magnesium compound from about 1:1 to about 50:1; and
   a porous support having at least one of a specific surface area of about 100 m$^2$/g or more and about 2,000 m$^2$/g or less, a pore volume of about 0.2 cc/g or more and about 5 cc/g or less, and a median particle size (by volume) of about 1 micron or more and about 200 microns or less,
   the solid titanium catalyst component having a diameter from about 20 microns to about 150 microns (on a 50% by volume basis).

2. The solid titanium catalyst component of claim 1, wherein the porous support has at least two of a specific surface area of about 200 m$^2$/g or more and about 1,500 m$^2$/g or less, a pore volume of about 0.3 cc/g or more and about 4 cc/g or less, and a median particle size (by volume) of about 5 microns or more and about 150 microns or less.

3. The solid titanium catalyst component of claim 1, wherein the porous support has a specific surface area of about 300 m$^2$/g or more and about 1,000 m$^2$/g or less, a pore volume of about 0.5 cc/g or more and about 3 cc/g or less, and a median particle size (by volume) of about 10 microns or more and about 100 microns or less.

4. The solid titanium catalyst component of claim 1, wherein the porous support comprises at least one selected from the group consisting of silica, alumina, alumina-silicates, ceria, zeolites, clay, zirconia, titania, zinc oxide.

5. The solid titanium catalyst component of claim 1, wherein the inorganic magnesium compound is at least one selected from the group consisting of magnesium chloride, magnesium bromide, magnesium iodide, and magnesium fluoride, and the inorganic titanium compound comprises at least one selected from the group consisting of titanium chloride, titanium bromide, titanium iodide, and titanium fluoride.

6. The solid titanium catalyst component of claim 1, wherein the alcohol comprises an alkyl alcohol containing from 1 to about 12 carbon atoms.

7. The solid titanium catalyst component of claim 1 further comprising an internal electron donor.

8. The solid titanium catalyst component of claim 1, wherein the magnesium alcohol adduct is not dealcoholed.

9. The solid titanium catalyst component of claim 1, wherein the porous support comprises at least one selected from the group consisting of silica, alumina, alumina-silicates, ceria, zeolites, clay, zirconia, titania, zinc oxide.

10. The solid titanium catalyst component of claim 1, wherein the alcohol comprises an alkyl alcohol containing from 1 to about 12 carbon atoms.

11. The solid titanium catalyst component of claim 1, wherein the magnesium-alcohol adduct is made by contacting the alcohol and the inorganic magnesium at a molar ratio of the alcohol to the inorganic magnesium compound of about 0.1:1 to about 1:0.1.

12. A solid titanium catalyst component for the polymerization of olefins, consisting essentially of:
   an inorganic titanium compound; a magnesium alcohol adduct made from an inorganic magnesium compound and an alcohol; and
   a porous support having at least one of a specific surface area of about 100 m$^2$/g or more and about 2,000 m$^2$/g or less, a pore volume of about 0.2 cc/g or more and about 5 cc/g or less, and a median particle size (by volume) of about 1 micron or more and about 200 microns or less,
   the solid titanium catalyst component having a diameter from about 20 microns to about 150 microns (on a 50% by volume basis).

13. A method of making a solid titanium catalyst component for the polymerization of olefins, comprising:
   combining an inorganic magnesium compound, an alcohol, and an organic medium to form a magnesium alcohol adduct, wherein the alcohol and the inorganic magnesium compound are contacted at a molar ratio of the alcohol to the inorganic magnesium compound from about 0.1:1 to about 1:0.1, and wherein the organic medium and the inorganic magnesium compound are contacted at a molar ratio of the organic medium to the inorganic magnesium compound from about 1:1 to about 50:1;
   impregnating the adduct onto a porous support having at least one of a specific surface area of about 100 m$^2$/g or more and about 2,000 m$^2$/g or less, a pore volume of about 0.2 cc/g or more and about 5 cc/g or less, and a median particle size (by volume) of about 1 micron or more and about 200 microns or less; and
   contacting the adduct impregnated porous support with an inorganic titanium compound.

14. The method of claim 13, wherein the porous support has a specific surface area of about 300 m$^2$/g or more and about 1,000 m$^2$/g or less, a pore volume of about 0.5 cc/g or more and about 3 cc/g or less, and a median particle size (by volume) of about 10 microns or more and about 100 microns or less.

15. The method of claim 13, wherein the porous support comprises at least one selected from the group consisting of silica, alumina, alumina-silicates, ceria, zeolites, clay, zirconia, titania, and zinc oxide.

16. The method of claim 13, wherein the inorganic magnesium compound is at least one selected from the group consisting of magnesium chloride, magnesium bromide, magnesium iodide, and magnesium fluoride, and the inorganic titanium compound comprises at least one selected from the group consisting of titanium chloride, titanium bromide, titanium iodide, and titanium fluoride.

17. The method of claim 13, wherein the magnesium compound and the alcohol are heated to a temperature from about 40° C. to about 200° C.

18. The method of claim 13, wherein the inorganic magnesium compound and the alcohol are heated for a time from about 5 minutes to about 15 hours.

19. The method of claim 13, wherein the magnesium alcohol adduct is made by contacting the alcohol and the inorganic magnesium compound at a molar ratio of the alcohol to the inorganic magnesium compound from about 0.25:1 to about 1:0.25.

20. The method of claim 13, wherein the organic medium is one or more selected from the group consisting of butane, pentane, hexane, heptane, octanes, decane, kerosene, cyclopentane, cyclohexane, cyclooxtane, benzene, tolune, xylene, ethylbenzene, and napthalenes.

* * * * *